Figure 3:
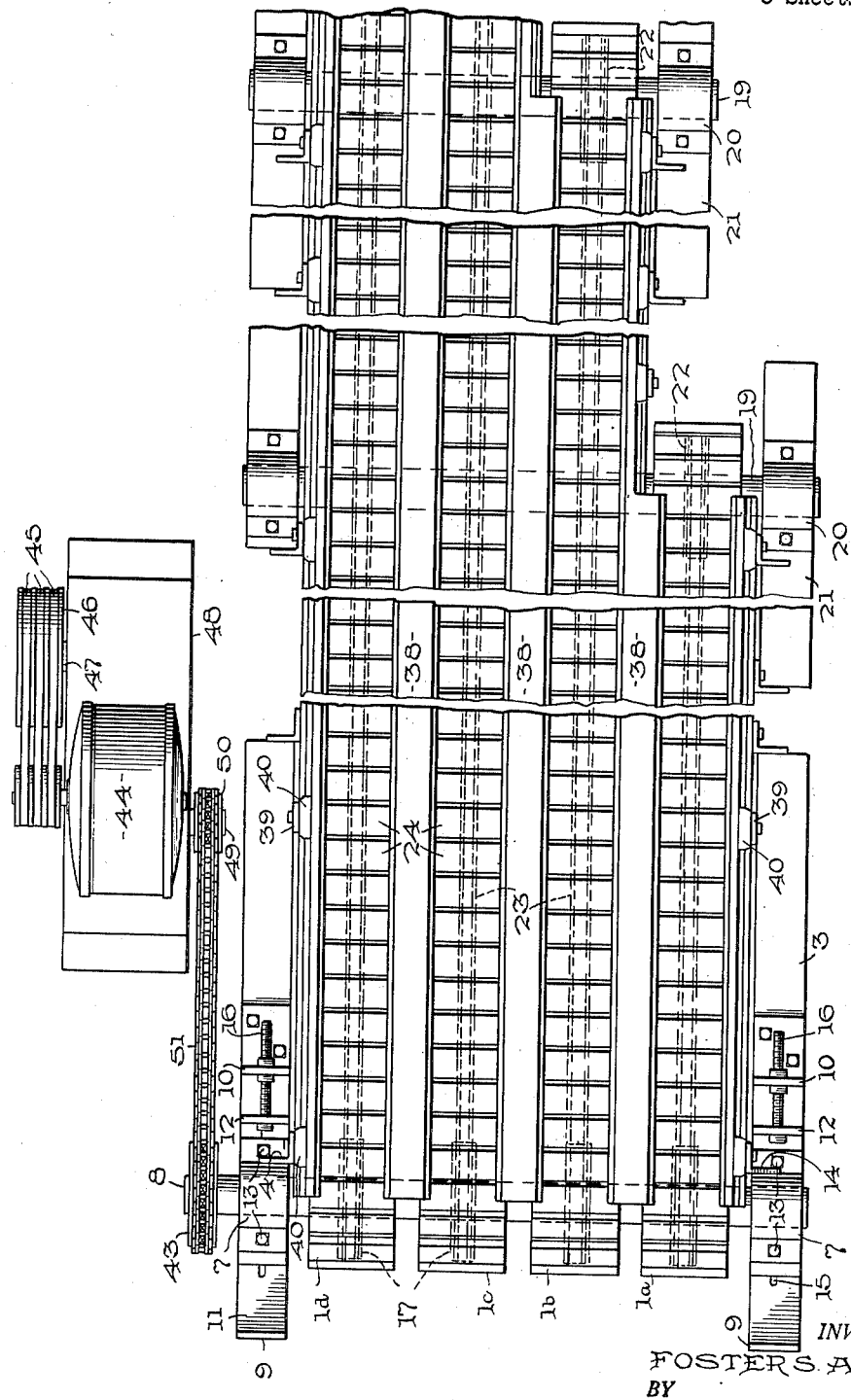

Aug. 1, 1950  F. S. ACTON  2,517,371
CONVEYING MECHANISM
Filed Feb. 7, 1948  3 Sheets-Sheet 1
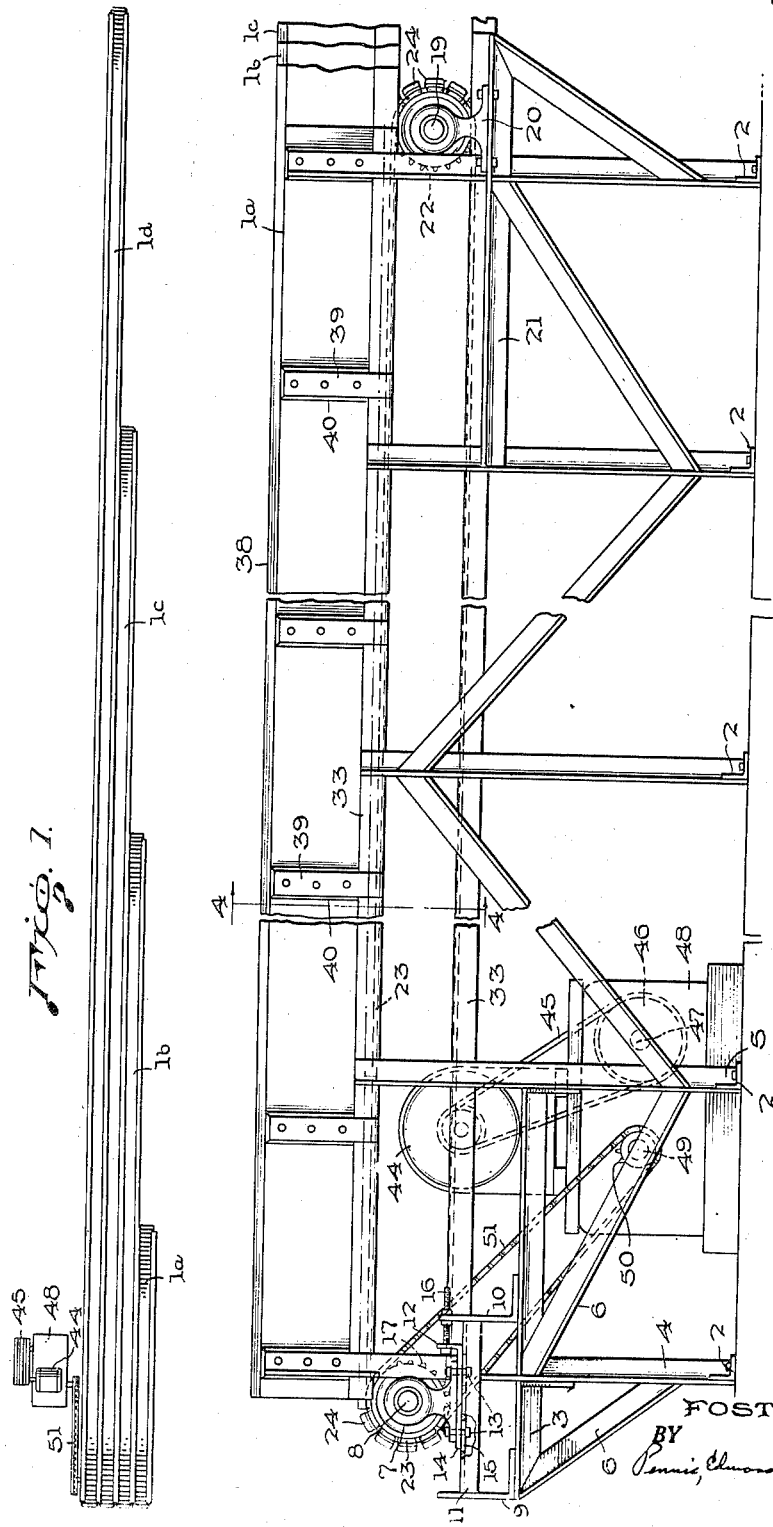
INVENTOR.
FOSTER S. ACTON
BY
ATTORNEYS Aug. 1, 1950  F. S. ACTON  2,517,371
CONVEYING MECHANISM
Filed Feb. 7, 1948  3 Sheets-Sheet 2

INVENTOR.
FOSTER S. ACTON
BY
Pennie, Edmonds, Morton + Barrows
ATTORNEYS

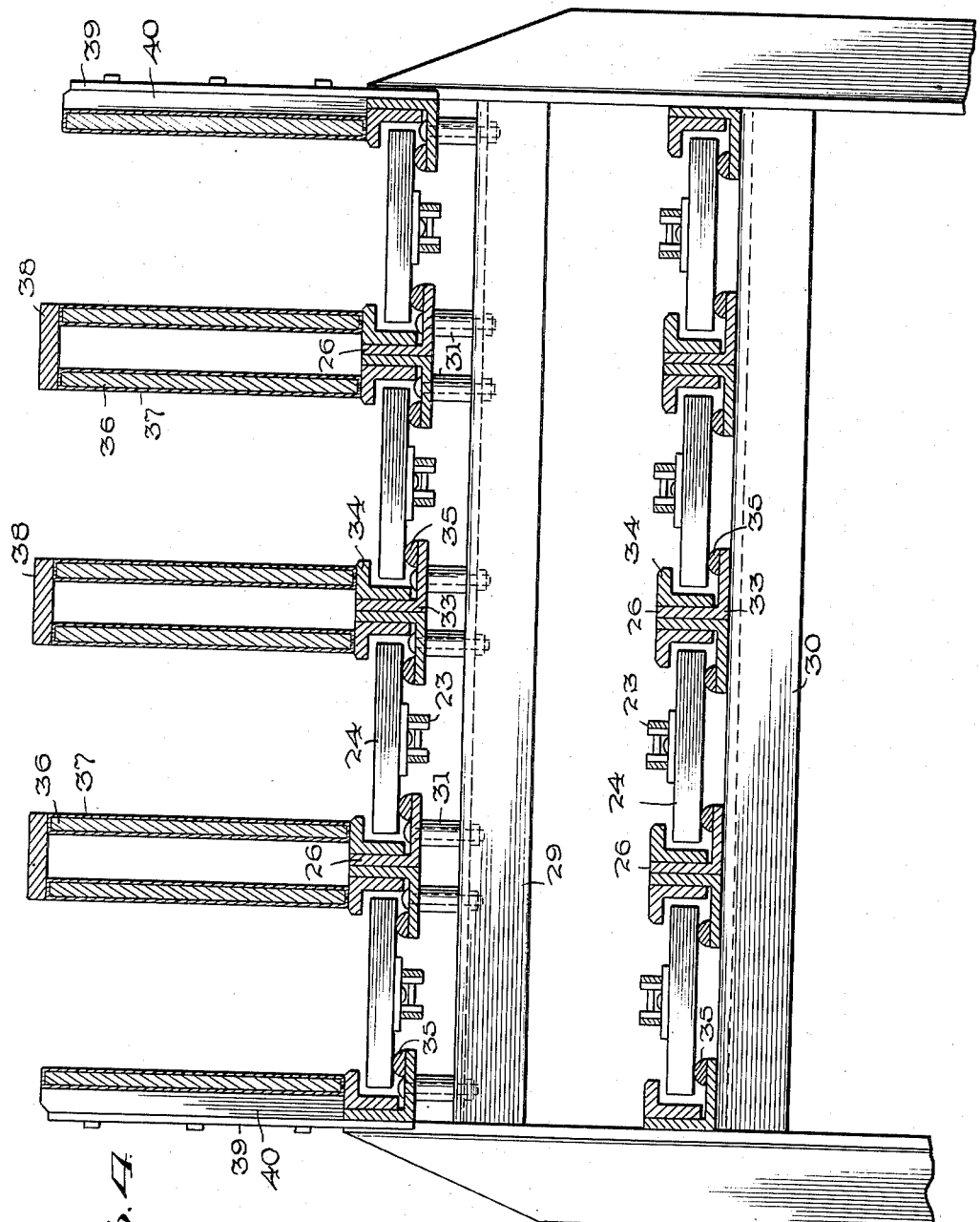

Patented Aug. 1, 1950

2,517,371

UNITED STATES PATENT OFFICE 2,517,371

CONVEYING MECHANISM

Foster S. Acton, New York, N. Y.

Application February 7, 1948, Serial No. 6,921

2 Claims. (Cl. 198—42)

This invention relates to an article transfer mechanism and more particularly to a conveyor unit having endless conveying elements for transferring articles from a single source of supply to a plurality of places located at different distances therefrom.

In many factories, such as those where furniture is manufactured on a relatively large scale, there may be a number of machines located at different positions, each of which must be supplied with material from a common source of supply. In such cases the material should be supplied to a position sufficiently close to the operators of the respective machines so that it may be received and used by them without the necessity of their leaving the machines.

Heretofore, mechanical means for such a method of supply have been proposed. However, in most cases, the means proposed have not been entirely satisfactory. For example, a roller conveyor may satisfactorily carry articles, such as pieces of lumber of large dimensions which have substantially flat surfaces, but it will not satisfactorily convey extremely short or odd pieces, which tend to fall between the rollers; rather, it will jam. This, of course, causes an inconvenient interruption of the transfer process, or it may even be responsible for halting it entirely.

In accordance with the present invention means are provided for transferring articles of any shape or size from a loading position to the operators of a plurality of machines spaced at different distances from the loading position.

More specifically, the present invention relates to a conveyor unit comprising, preferably, a number of conveying elements of different operative lengths which are in dependent relation to one another, are supported by a common framework and are driven by a single driving means. The several conveying elements are so constructed that they each present a smooth, continuous transfer surface not subject to jamming. The articles to be carried are confined to the paths of travel of the conveying elements by metal sideboards or deflectors, secured at both sides of each conveying element, and thus are prevented from sliding or falling off during transfer. The several conveying elements are driven by any suitable means, such as an electric motor and a variable speed transmission, which allow the articles to be transferred at any desirable rate of speed.

The invention will be more specifically described in conjunction with the accompanying drawings which show one embodiment thereof, and in which;

Fig. 1 is a more or less diagrammatic plan view of a conveyor unit embodying the present invention and showing the relative lengths of the conveying elements which comprise the unit, Fig. 2 is an elevation view, on an enlarged scale, of the driving end of the conveyor unit, Fig. 3 is a plan view, on an enlarged scale, of the driving end of the conveyor unit, and Fig. 4 is a transverse sectional view of the conveyor unit taken along line 4—4 of Fig. 2.

Referring to the drawings, the conveyor unit consists of four unitary endless conveying elements $1^a$, $1^b$, $1^c$, $1^d$, supported by a suitable framework preferably formed of standard metal angle bars so arranged and disposed that a sturdy, rigid supporting structure is provided for the conveying elements. The angle bars may be welded together or otherwise connected by any suitable means to form the framework, and are sufficient in both number and size to result in a structure capable of firmly and rigidly supporting the conveying elements and the articles to be carried thereupon.

Brackets 2 are welded or bolted to the lower ends of the vertical bars of the supporting frame, or to as many of them as is necessary to form anchoring means for securing the supporting frame to the floor. Bolts or screws are passed through the horizontal arms of such brackets thereby rigidly securing the supporting frame to the floor.

At the receiving end of the conveyor unit, angle members 3, each having one of its arms extending horizontally, are disposed on both sides of the framework and are attached by welding, or otherwise secured to vertical leg members 4 and 5, being further supported by diagonal members 6. Bearings 7, for a drive shaft 8 of the unit, are mounted on the horizontally-extending arms of the angle members 3, as will be subsequently described. To that end, angle bracket members 9 and 10 are fixedly mounted in an appropriately spaced relation upon the horizontally-extending arms of the angle members 3 and form supports for other angle bars 11 which are in turn longitudinally disposed above and parallel to the members 3 and have one arm extending horizontally. The angle bars 11 are welded, or otherwise attached to the brackets 9 and 10 to form supports for L-shaped bearing supporting members 12, the longer arms of which are horizontally disposed. The bearings are placed upon the supporting members 12 and both the bearings and supporting members are adjustably positioned by means of bolts 13 which pass through holes in the flanged bases 14 of the bearings, through oppositely spaced holes in the supporting members and through longitudinal slots 15 in the horizontal members 11. A threaded member 16 projects horizontally inward from each of the vertical arms of the bearing supporting members 12, passes through a suitably located hole in each of the upright arms of the brackets 10 and has nuts thereon so that the bearings and bearing supporting members may be slidably adjusted along the horizontal arm of the member 11 within the limits provided by the slack in the drive chain 51. This type of mounting for the bearings provides a convenient means for adjusting them in a longitudinal direction thus allowing any undesirable slack in the conveying elements to be taken up.

The drive shaft 8 forms a common means for driving each of the conveying elements, and to that end has conveyor driving sprockets 17, one for each of the conveying elements, secured thereto at spaced intervals along its length for rotation therewith. An idling shaft 19 is mounted in bearings 20 located at the ends of each conveying element remote from the driving end. The bearings 20 are fixedly attached to horizontal members 21 which in turn are secured to the framework in a manner similar to that in which angle members 3 are secured at its receiving end. A sprocket 22 is secured to each of the idling shafts 19 for rotation therewith and the conveying elements 1a, 1b, 1c, 1d are carried by the oppositely situated sprockets 17 and 22.

The unitary conveying elements each comprise and endless chain 23 to the links of which slats or pallets 24 are firmly affixed in any suitable manner so that nothing protrudes from the work-conveying surfaces thereof which may scratch or mar the carried articles or interfere with the proper functioning of the conveyor unit. The slats or pallets preferably are rectangular in shape and made of any suitable material, such as wood, metal, etc. The spacing of these slats or pallets upon the endless chains is such that their edges are so closely adjacent one another in planar travel that their outer surfaces present a substantially continuous, smooth conveying surface, thus eliminating the possibility of articles being carried thereon slipping in between successive slats or pallets and thereby interrupting the operation of the conveyor unit or damaging the articles being carried.

As indicated in Fig. 1 of the drawings, the conveying elements are of different lengths in order to carry out the primary function of the conveyor unit, that is, to transfer articles from a single source to a number of stations located at different distances from said source, for example, from a single source of material in a furniture factory to several machines placed at different distances therefrom which are to be supplied with pieces of lumber from such source. Thus the conveyor mechanism may be desirably installed with its receiving end adjacent such source and with the discharge ends of the several conveying elements adjacent the several machines, the length of the respective conveying elements being governed by the distance to the respective machine each is to supply.

Lateral or vertical motion of the several conveying elements is controlled and constrained by longitudinally disposed guides 26 positioned at opposite sides of each conveying element. These guides are arranged in two sets, one set being provided for the upper flight and one set for the lower flight of each of the conveyors. As shown in Fig. 4, the guides are supported by upper and lower transversely-disposed members 29 and 30 of the supporting framework. The upper set of guides is for the purpose of governing the movement of the upper flights of the conveying elements during the functional part of their paths of travel, that is during the portion of the paths of travel when articles are being carried on the conveying elements; while the lower set of guides governs the movement of the lower flights of the conveying elements during the non-functional or return portion of their paths of travel. The upper and lower sets of guides are of identical design, the only difference between the two sets being that the guides of the lower set rest directly upon the transverse supporting members 30 and are bolted or otherwise attached directly thereto; while the guides forming the upper set are spaced from their transverse supporting members 29 by metal spacers 31. The spacing of the upper set of guides from the supporting member 29 is for the purpose of providing adequate space for the driving chains between the support 29 and the lower surface of the slats or pallets.

Each of the guides comprises two longitudinally disposed angle members 33 and 34 having their long arms welded together in such a manner that the short arms extend in the same direction to form a U-shaped channel to receive an edge of one of the conveying elements. Where adjacent edges of separate conveying elements are to be guided, for example, the adjacent edges of elements 1a and 1b, separate guides, attached to one another in a back-to-back relation, are used. If desired, an I-beam may be used instead of each pair of back-to-back guides and will serve the same purpose, that is, the guiding of two adjacent edges of separate conveying elements. Half-round steel bars 35 are secured to, and longitudinally disposed along, the distal edges of the horizontal arms of the lower angle irons of each guide to form arcuate bearings or supporting surfaces for the outer portions of the slats or pallets.

In addition to constituting means for preventing any undesirable sagging of the conveying elements, or any lateral or vertical motion thereof, the guides form supports for metal covered sideboards or deflectors. Each sideboard or deflector is formed by a wooden plank 36 of suitable thickness covered with metal 37 of appropriate gauge. The sideboards or deflectors are firmly secured to the horizontal upper surfaces of the upper guides. Where two such sideboards are closely adjacent one another, their upper edges are connected by horizontally disposed metal covered planks 38 to form rigid, box-like structures. On the other hand, where single sideboards or deflectors stand alone, so do those resting upon the outermost guides, they are braced by upstanding steel plates 39 of such length that when the steel plates are welded to the outermost guides their upper edges are substantially flush with the upper edges of the sideboards or deflectors. Wooden fillers 40, of a shape similar to that of the metal brace plates, are disposed between such plates and the sideboards which they are to brace. The sideboards may be connected in any suitable manner to the wooden fillers 40 and to the stiffening metal plates 39 to form a rigid structure. However, no part of the securing means should protrude from the inner surfaces of the sideboards, as any such protrusion would interfere with the desired, uninterrupted transfer of articles being carried by the conveying elements.

The driving means for the conveyor unit comprises a driving sprocket 43 mounted on the end of the drive shaft 8 for rotation therewith, adjacent the longest conveying element, and connected with any means for supplying driving power, as for example, an electric motor 44. Such electric motor is suitably mounted and by means of an endless belt or chain 45 is connected to, and drives, a drum 46 mounted on the input shaft 47 of a variable speed transmission 48. The output shaft 49 of the variable speed transmission has a sprocket 50 mounted thereon which, by a drive chain 51, transmits power to the driving sprocket 43, and thus in turn to the common drive shaft 8 of the conveyor unit. Consequently, by proper control and adjustment of the electric motor and the variable speed transmission the conveying elements may be driven at any desired speed.

The conveyor unit is installed between the source of the articles to be transferred and the operators of the several machines to be supplied, with the loading end of the unit being adjacent the source and the discharge end of each conveying element terminating adjacent one of the machines. When the conveyor unit is in operation, articles placed upon the respective conveying elements at the loading end will be discharged at, or taken from the conveying surfaces by the operators of, the machines where the articles are to be used. The conveyor unit, as described, thus dispenses with considerable movement on the part of the operators of the various machines supplied by it and provides a labor-saving as well as a time-saving means for the transfer of articles.

It is to be understood that, although the conveyor unit described and shown in the drawings is one comprising four conveying elements, this is not to be construed as in any way limiting the scope of the invention, as the number of conveying elements comprising such a conveyor unit is primarily dependent upon the number and position of the machines to be served. It also is to be understood that various changes may be made in the details of the conveyor unit, as described, without departing from the invention or sacrificing the advantages thereof.

I claim:

1. A conveyor mechanism for lumber and the like comprising a supporting frame, bearings mounted on said supporting frame and adjustable longitudinally thereof, a drive shaft supported in said bearings and extending transversely of the frame at one end thereof, a plurality of driving sprockets affixed to said drive shaft at spaced intervals for rotation therewith, idling shafts supported by the frame and extending transversely thereof at different distances from the drive shaft, an idling sprocket mounted on each of said idling shafts, each of said idling sprockets being secured to the idling shaft on which it is mounted against longitudinal movement therealong and opposite one of said driving sprockets, an endless chain carried by each of said driving sprockets and its respective oppositely-situated idling sprocket, a plurality of article-conveying pallets secured to each of said chains and extending transversely of their direction of travel, said pallets being secured to said chains sufficiently close to one another that in planar travel the pallets carried by each chain collectively present a substantially continuous conveying surface of a conveying element, a U-shaped guide for each opposite edge of each conveying element in planar travel having the base portion thereof in a vertical plane and the legs thereof horizontally disposed to respectively overlie and underlie the outer edge portions of the pallets, a bearing member having an upper arcuate bearing surface extending longitudinally of and attached to the upper surface of the lower leg of each of said guides in a position to underlie and partially support said outer edge portions of said pallets in planar travel, and an article-confining sideboard at each side of each of said conveying elements supported by the upper surface of the U-shaped guide adjacent the same side of each of said conveying elements and extending above the horizontal plane of the upper flight of said conveying elements.

2. A conveyor mechanism for lumber and the like comprising a supporting frame, bearings mounted on said supporting frame and adjustable longitudinally thereof, a drive shaft supported in said bearings and extending transversely of the frame at one end thereof, a driving sprocket non-rotatably affixed to said drive shaft, an idling shaft supported by the frame and extending transversely thereof at the end of said frame opposite the end at which said drive shaft is supported, an idling sprocket mounted on said idling shaft, said idling sprocket being secured to the idling shaft against longitudinal movement therealong and opposite the driving sprocket, an endless chain carried by said driving sprocket and its oppositely-situated idling sprocket, a plurality of article-conveying pallets secured to said endless chain and extending transversely of their direction of travel, said pallets being secured to said endless chain sufficiently close to one another that in planar travel the pallets carried by the chain collectively present a substantially continuous conveying surface of a conveying element, a U-shaped guide for each of the opposite edges of the conveying element in planar travel having the base portion thereof in a vertical plan and the legs thereof horizontally disposed to overlie and underlie the outer edge portions of the pallets, a bearing member having an upper arcuate bearing surface extending longitudinally of and attached to the upper surface of the lower leg of each of said guides in a position to underlie and partially support said outer edge portions of said pallets in planar travel, and an article-confining sideboard at each side of said conveying element supported by the upper surface of the U-shaped guide adjacent the same side of said conveying element and extending above the horizontal plane of the upper flight of said conveying element.

FOSTER S. ACTON.

REFERENCES CITED

The following references are of record in the file of this patent:

UNITED STATES PATENTS

| Number | Name | Date |
| --- | --- | --- |
| 369,550 | Phillips | Sept. 6, 1887 |
| 545,619 | Walrath | Sept. 3, 1895 |
| 1,119,531 | Palmer | Dec. 1, 1914 |
| 1,332,356 | Olson | Mar. 2, 1920 |
| 1,391,693 | Richardson | Sept. 27, 1921 |
| 2,021,748 | Schaefer | Nov. 19, 1935 |
| 2,233,379 | Cope | Feb. 25, 1941 |
| 2,303,976 | Bawcutt | Dec. 1, 1942 |
| 2,334,511 | Seubert | Nov. 16, 1943 |

FOREIGN PATENTS

| Number | Country | Date |
| --- | --- | --- |
| 531,463 | Germany | Nov. 4, 1931 |
| 592,755 | Germany | Feb. 14, 1934 |